United States Patent
Pallini, Jr. et al.

(10) Patent No.: US 6,422,791 B1
(45) Date of Patent: Jul. 23, 2002

(54) RISER TO SLEEVE ATTACHMENT FOR FLEXIBLE KEEL JOINT

(75) Inventors: Joseph William Pallini, Jr., Tomball; Kim Hoang Phan, Houston; Jerry Keith Rhodes, Conroe; Chii Ren Lin, Bellaire; Rickie Gene Wester, Houston; Rockford D. Lyle, Pinehurst, all of TX (US)

(73) Assignee: ABB Vetco Gray Inc., Houston, TX (US)

( * ) Notice: Subject to any disclaimer, the term of this patent is extended or adjusted under 35 U.S.C. 154(b) by 0 days.

(21) Appl. No.: 09/542,567

(22) Filed: Apr. 4, 2000

(51) Int. Cl.[7] ............................ F16F 1/14; F16L 21/02; F16L 27/10
(52) U.S. Cl. .................. 405/224.2; 166/355; 285/224; 267/154; 403/221
(58) Field of Search .................... 405/195.1, 224.2, 405/224.3, 224.4; 166/350, 351, 355, 367; 285/224, 226–229; 267/150, 154, 160–163, 182; 403/220, 221, 225

(56) References Cited

U.S. PATENT DOCUMENTS

| | | | | |
|---|---|---|---|---|
| 3,101,798 A | * | 8/1963 | Wilson et al. ........... 166/350 X |
| 3,913,668 A | * | 10/1975 | Todd et al. ............. 166/355 X |
| 4,099,560 A | | 7/1978 | Fischer et al. ............. 166/350 |
| 4,826,145 A | * | 5/1989 | Moore et al. ............... 267/154 |
| 4,846,509 A | * | 7/1989 | Moore ......................... 285/225 |
| 4,856,827 A | * | 8/1989 | Delamare ............... 166/355 X |
| 4,911,483 A | * | 3/1990 | Delamare ............... 166/355 X |
| 5,286,132 A | * | 2/1994 | Morini ...................... 403/162 |
| 5,363,920 A | * | 11/1994 | Alexander et al. ........ 405/224.4 |
| 5,413,431 A | * | 5/1995 | Fellows ...................... 403/220 |
| 5,683,205 A | | 11/1997 | Halkyard ................. 405/224.2 |
| 5,984,585 A | * | 11/1999 | Pallini et al. ............ 405/195.1 |

* cited by examiner

Primary Examiner—Thomas B. Will
Assistant Examiner—Tara L. Mayo
(74) Attorney, Agent, or Firm—Bracewell & Patterson, L.L.P.

(57) ABSTRACT

An attachment extends between an outer sleeve and an inner riser pipe where the pipe penetrates the keel of a platform. In one version, the attachment is a conically-shaped with a small diameter ring that engages the riser pipe and a large diameter ring that engages the outer sleeve. This attachment has elements that are very flexible in bending but relatively stiff and strong in axial load. Other versions include flat rings where lateral load is taken directly into tension and compression in the beams, allowing for relatively high lateral load transfer. Both the conically-shaped attachment and the flat ring have a number of variations that provide low bending stiffness but high axial stiffness of the elements. Depending on whether resistance to axial loads, lateral loads, or resistance to combination of both loads is desired, the attachment and the flat ring may be used alone or in combination. Other variations of the device provide two opposing conical shaped attachments or a conical and flat ring attachment installed together to provide load capability in both axial and lateral directions while still providing angular flexibility.

35 Claims, 7 Drawing Sheets

RISER TO SLEEVE ATTACHMENT FOR FLEXIBLE KEEL JOINT

BACKGROUND OF THE INVENTION

1. Technical Field

The present invention relates in general to an improved flexible keel joint, and in particular to an improved riser to sleeve interface for flexible keel joints.

2. Description of the Prior Art

Deep water oil operations from floating vessels typically utilize risers or tendons that extend from the vessel to the sea floor. Such floating vessels include tension buoyant towers, compliant towers, and spars in which the structures extend well below the sea surface and are subjected to heave, pitch, and roll motion at the surface. The risers and tendons are connected to the sea floor and pass through openings in the keel or bottom portion of the vessels. The openings in the vessels constrain the pipe forming the risers or tendons when the vessel is moved laterally with respect to the sea floor connection. Such lateral movement produces bending of the pipe at the constraint opening, or rotation of the pipe about the contact of the pipe with the edges of the opening. Bending of the pipe, which is normally under tension, results in fatigue and wear at the constraint opening.

Prior art solutions for accommodating such riser/tendon stress include the use of thick-walled pipes with tapered ends. These thick, tapered wall sections are usually machined from heavy forgings and are very expensive. Another solution utilizes a sleeve member centralized within the vessel opening and a mud line or sea floor connection to receive the lower end of the pipe. The pipe is centralized within the sleeve but otherwise unattached to the sleeve. A third solution uses a centralizing, ring-like device, such as a ball joint, located between the side walls of the vessel opening and the pipe.

In U.S. Pat. No. 5,683,205, a joint is used on a pipe that passes through the vessel opening and is connected to the sea floor. The pipe is centralized within an outer sleeve with large elastomeric rings located at each axial end of the sleeve. Although the rings distribute bending stresses from the pipe to the sleeve by the pipe, they offer very limited axial load support and are subject to wear. An improved design for flexible keel joints is needed.

SUMMARY OF THE INVENTION

The invention relates to riser pipe extending from a subsea well to a surface platform. A sleeve is positioned around the riser pipe where the pipe penetrates the keel of the platform. The riser to sleeve attachment of the invention provides a high load carrying capacity in both the axial and lateral direction (or reduced capacity in one of these directions) but permits flexibility for angular offsets between an outer sleeve and a riser pipe.

A conical shaped ring embodiment of the invention is based on providing an attachment between a small diameter ring that engages a riser pipe and a large diameter ring that engages an outer sleeve, wherein the attachment has members that are very flexible in bending but relatively stiff and strong in axial load. The specific configuration of the attachment then determines the direction in which the high load transfer capability exists. The configuration of the conical embodiment acts to allow angular movement of the inner small diameter ring relative to the outer large diameter ring by producing only bending loads in the individual beams. The configuration of the cone, in regard to the angle of the beam relative to the axial direction, determines the relative stiffness and load capacity of this configuration.

In a second or flat ring embodiment, lateral load is taken directly into tension and compression in the beams, allowing for relatively high lateral load transfer. Both the conical shaped ring embodiment and the flat ring embodiment can have a number of variations that provide low bending stiffness but high axial stiffness of the members. The variations include individual rods connecting the inner small diameter ring and the outer large diameter ring. In addition, the manner of material removal to produce the flexible beams can produce a variety of other configurations. These configurations include slots that reverse on themselves to produce multidirectional beams and/or slots that double back on themselves. Additionally, alternating series of drilled holes can leave multi-linked curved beams.

Depending on whether resistance to axial loads, lateral loads, or resistance to combination of both loads is desired, the conical shaped ring embodiments of the attachment and the flat ring may be used alone or in combination. Other variations of the device provide two opposing conical shaped attachments or a conical and flat ring embodiment installed together to provide load capability in both axial and lateral directions while still providing angular flexibility.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE INVENTION

Figure 7:
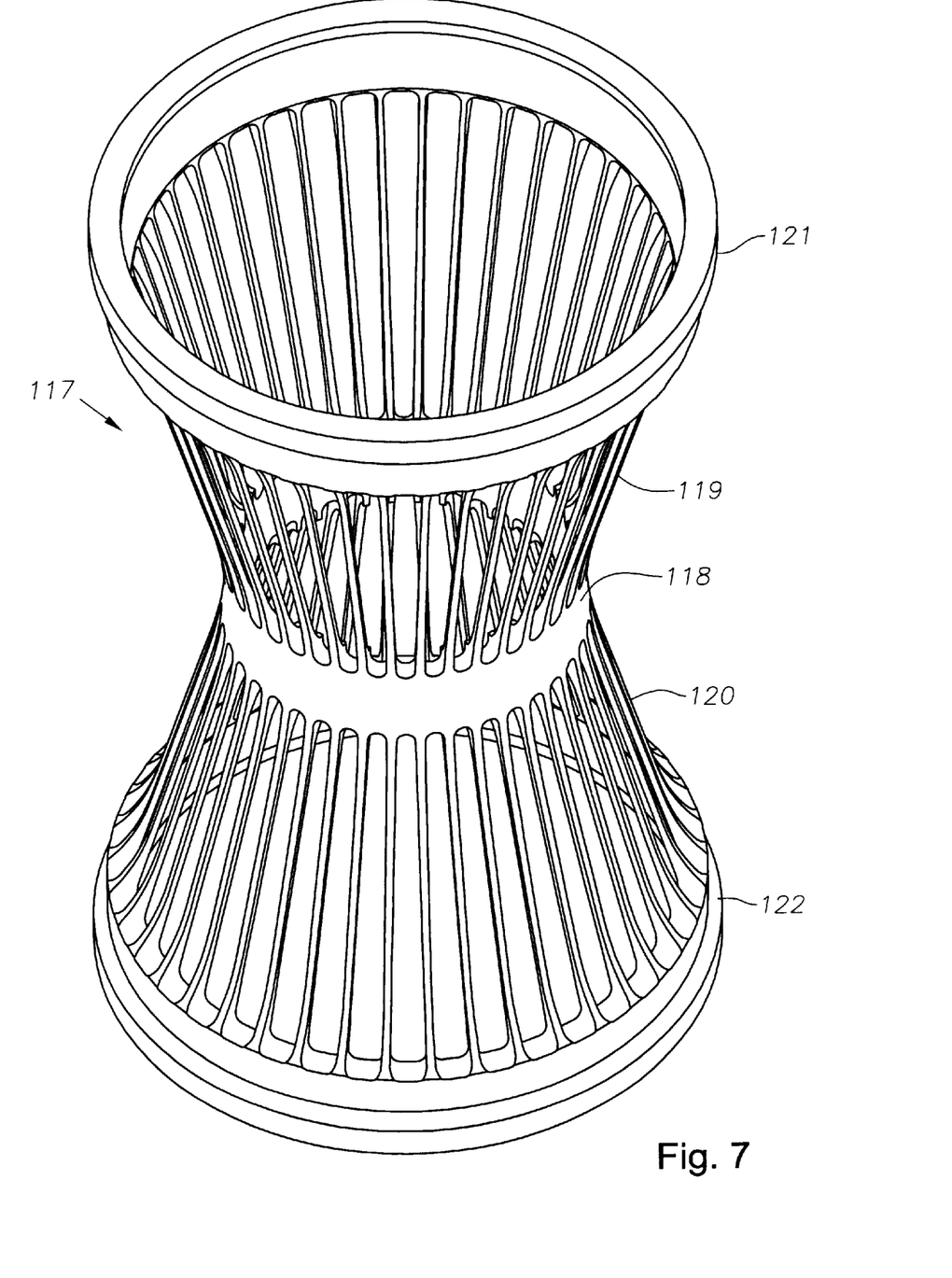
FIG. 7 is a perspective view of a double conical spring-like member constructed in accordance with the invention.
Figure 8A:
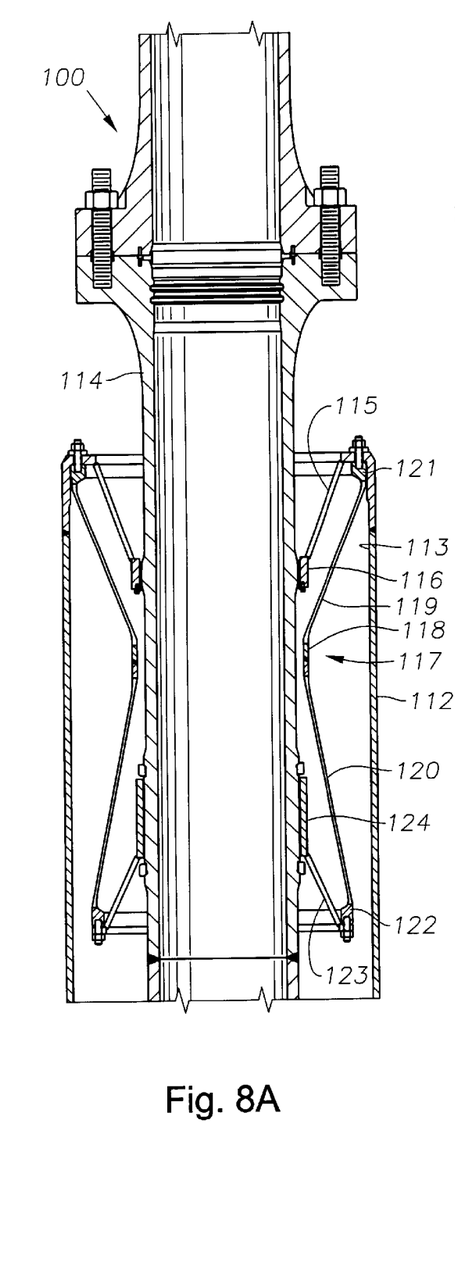
FIG. 8(a) is a sectional side view of an upper end of the riser sleeve assembly of the invention using the double conical spring-like member of FIG. 7.
Figure 8B:
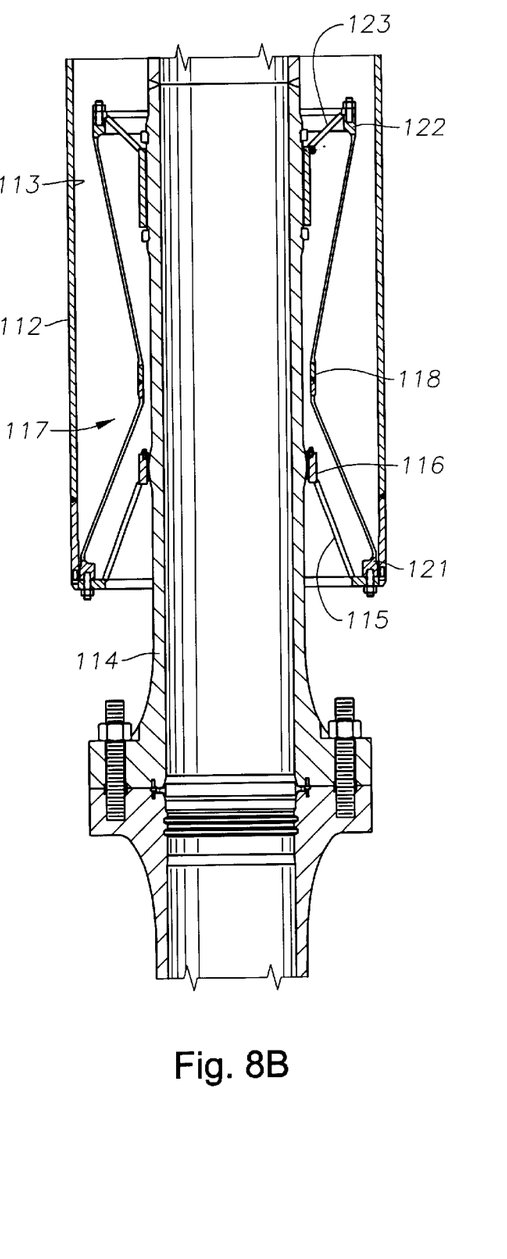
FIG. 8(b) is a sectional side view of a lower end of the riser sleeve assembly of the invention using the double conical spring-like member of FIG. 7.
Figure 9:
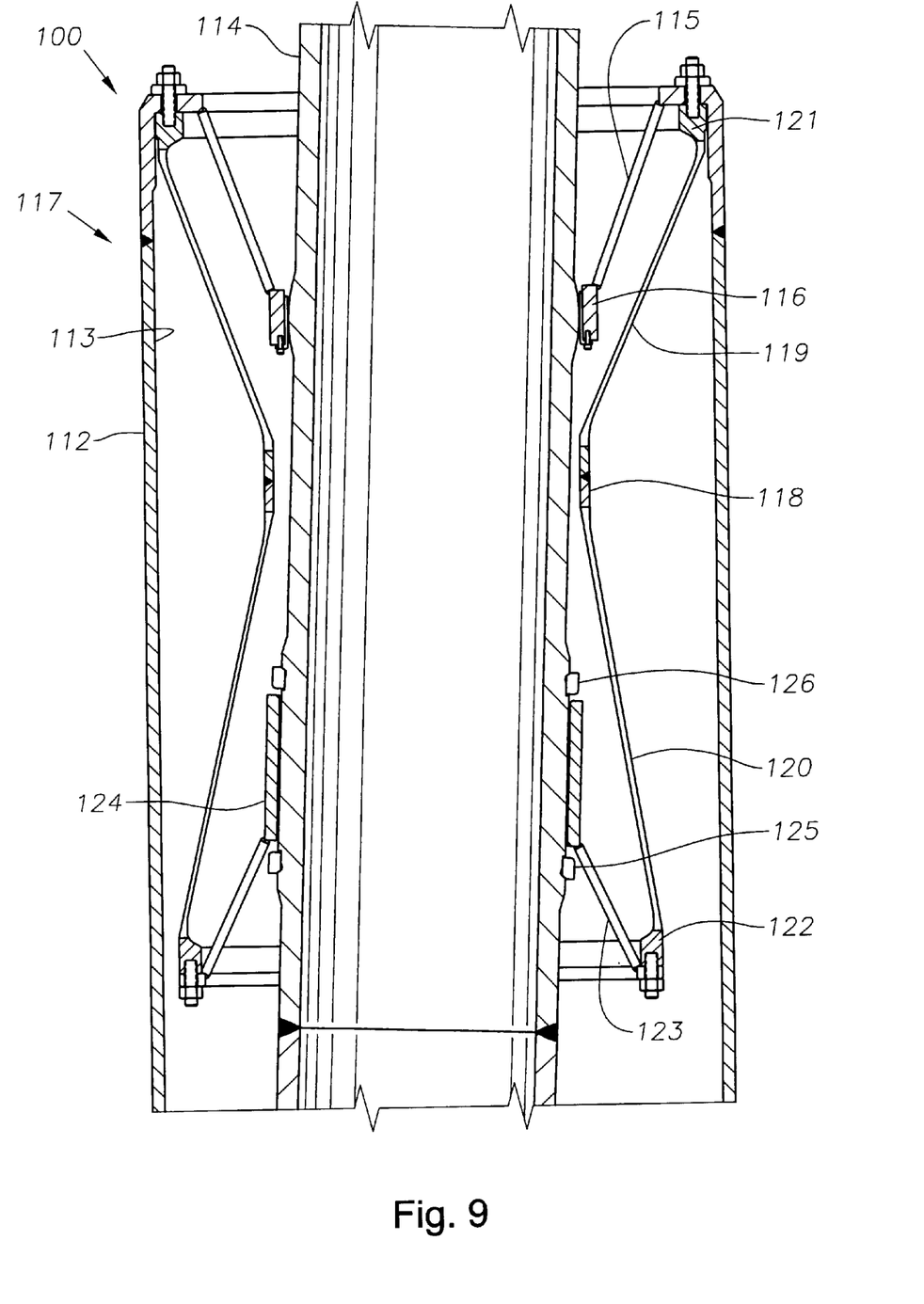
FIG. 9 is an enlarged sectional side view of the upper end of the riser sleeve assembly of FIGS. 8(a) and 8(b) showing the double conical spring-like member in a flexed state.

Referring now to FIGS. 1(a)–3, a riser sleeve assembly is designated generally 10. An outer sleeve 12 is provided having an inner surface 13. Preferably, outer sleeve 12 engages a keel hole in a spar production platform, although outer sleeve 12 may be used to distribute a bending moment in other applications. Riser pipe 14 passes through outer sleeve 12. Riser pipe 14 and outer sleeve 12 each have a longitudinal axis that is substantially concentric with the other. An attachment 16 spans between outer sleeve 12 and riser pipe 14. Attachment 16 may be a metal conical spring-like member 18 (FIGS. 1(a)–3) with or without an optional metal disk 20 (FIGS. 1(a)–3, 5, and 6), or a double conical spring-like member 117 (FIGS. 7–9). These embodiments will be described in detail below.

Figure 1A:
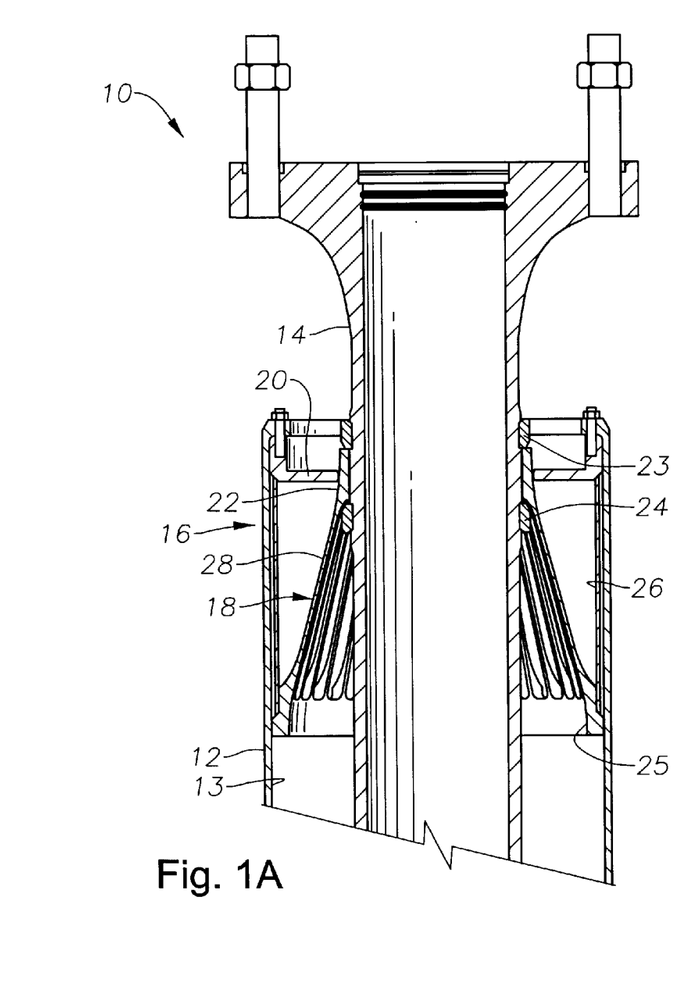
FIG. 1(a) is a cross-sectional view of an upper end of a riser sleeve assembly constructed in accordance with the invention.
Figure 1B:
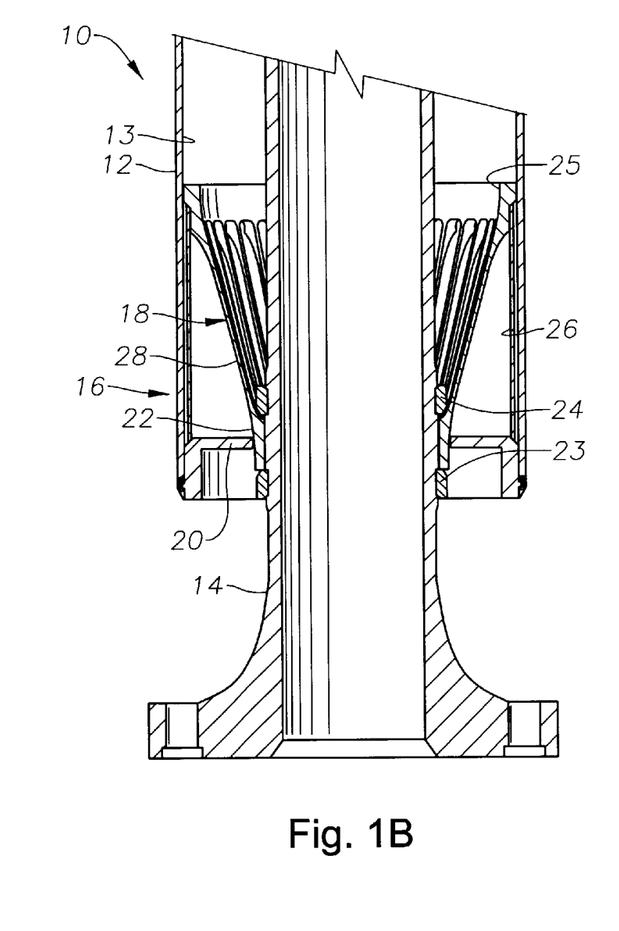
FIG. 1(b) is a cross-sectional view of a lower end of the riser sleeve assembly of FIG. 1(a).

The upper conical spring-like member 18 (FIG. 1(a)) is congruent with and inverted relative to the lower conical spring like member 18 (FIG. 1(b)). Each conical spring-like member 18 is made up of a small diameter ring 22 for engaging riser pipe 14 and a large diameter ring 25 for engaging an inner surface 13 of outer sleeve 12. Rings 22, 25 are axially spaced-apart from each other. The small diameter ring 22 of upper member 18 is located above its large diameter ring 25, whereas the small diameter ring 22 of lower member 18 is located below its large diameter ring 25. Preferably, the large diameter rings 25 are not affixed to inner surface 13 of outer sleeve 12. A support member sleeve 26 connects each large diameter ring 25 to disk 20 (FIGS. 1(a)–3). Support member sleeves 26 have an axial dimension that is approximately equal to an axial dimension of members 18. Small diameter rings 22 are rigidly secured to riser pipe 14 by external attachment ring 23 and internal attachment ring 24.

A plurality of thin ribs or beams 28 interconnect small diameter ring 22 and large diameter ring 25, giving members 18 a frusto-conical appearance or configuration. The beams 28 are symmetrically spaced about the rings 22, 25. Beams 28 are designed to flex to allow an angular offset between riser pipe 14 and outer sleeve 12. Although most of the axial load generated by riser sleeve assembly 10 is carried by riser pipe 14, beams 28 are designed to be relatively stiff and strong to withstand axial loads that originate from the weight of outer sleeve 12, or from friction between outer sleeve 12 and member 18.

In practice, the riser sleeve assembly 10 may be used in any situation where axial and lateral load transfer exists between an outer sleeve 12 and a riser pipe 14. Such uses include situations wherein the outer sleeve 12 and riser pipe 14 pass through openings in the keel of a vessel, such as a spar platform (not shown). Additionally, the invention may be used in a tendon system and may be used for top and bottom flex joints in connection with a drill riser. When the riser pipe 14 and outer sleeve 12 bend, a moment in the riser 14 produces angular offset between riser pipe 14 and outer sleeve 12. Conical spring-like members 18 with shallow angle beams 28 transmit axial loading but allow flexion in a lateral direction.

Figure 2:
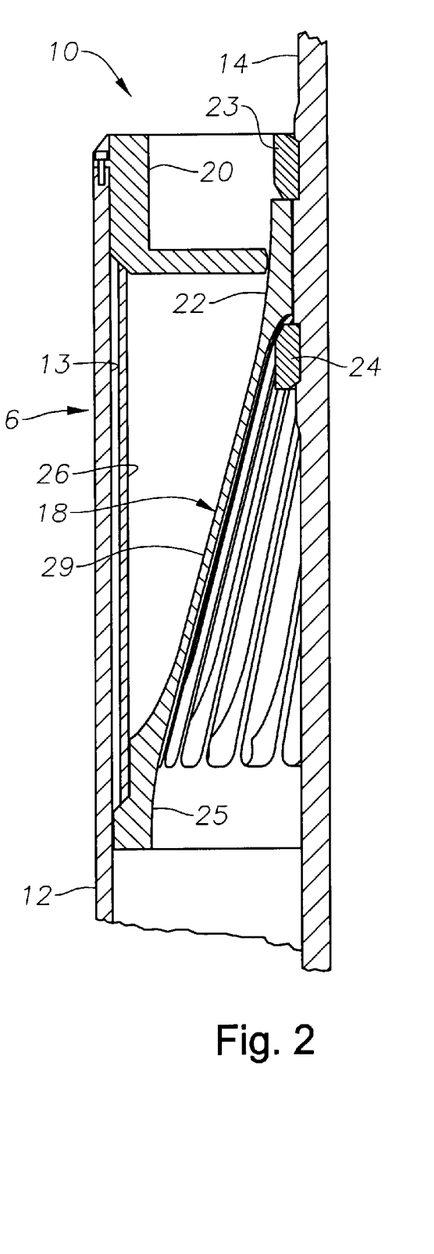
FIG. 2 is an enlarged sectional side view of a lower end of the riser sleeve assembly of FIG. 1(b).

In the embodiment of FIGS. 1A, 1B, and 2, a disk 20 is mounted adjacent to each of the upper and lower ends of outer sleeve 12. Note that disks 20 are essentially identical, other than the mechanism by which they are fastened to outer sleeve 12. Each disk 20 has an inner diameter that is slightly spaced apart from the small diameter ring 22 of spring-like member 18 (FIG. 2), and an outer diameter that is fastened directly to one end of outer sleeve 12 (Figures 1A and 1B). Disks 20 are solid elements that are designed to withstand radial or lateral loads of riser pipe 14 relative to sleeve 12. Preferably, disks 20 are used in conjunction with spring-like members 18.

Figure 3:
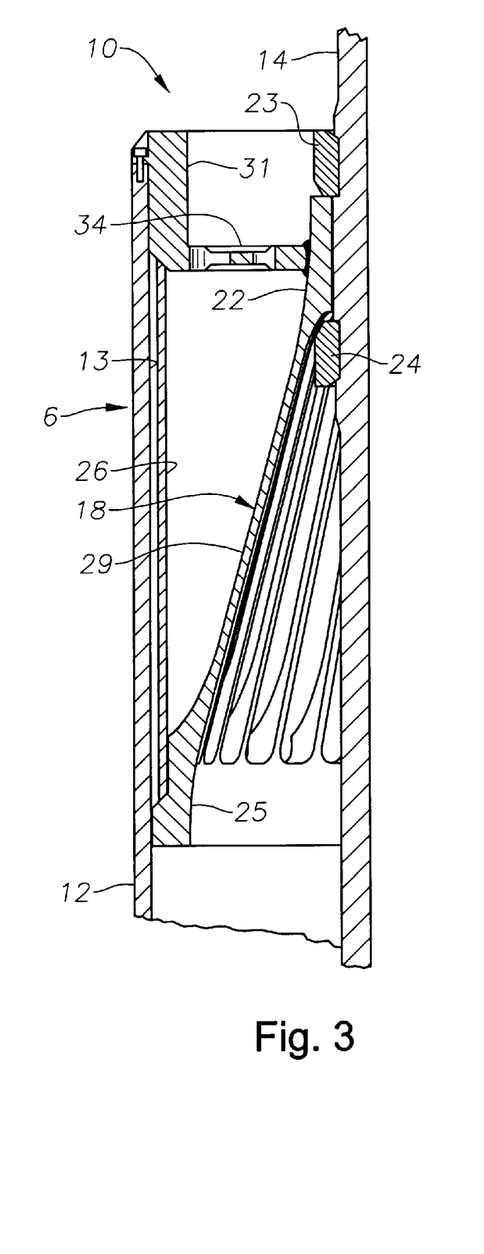
FIG. 3 is an enlarged sectional side view of a lower end of the riser sleeve assembly of FIG. 1(b) with an alternate embodiment of a disk that is perforated with holes.
Figure 4:
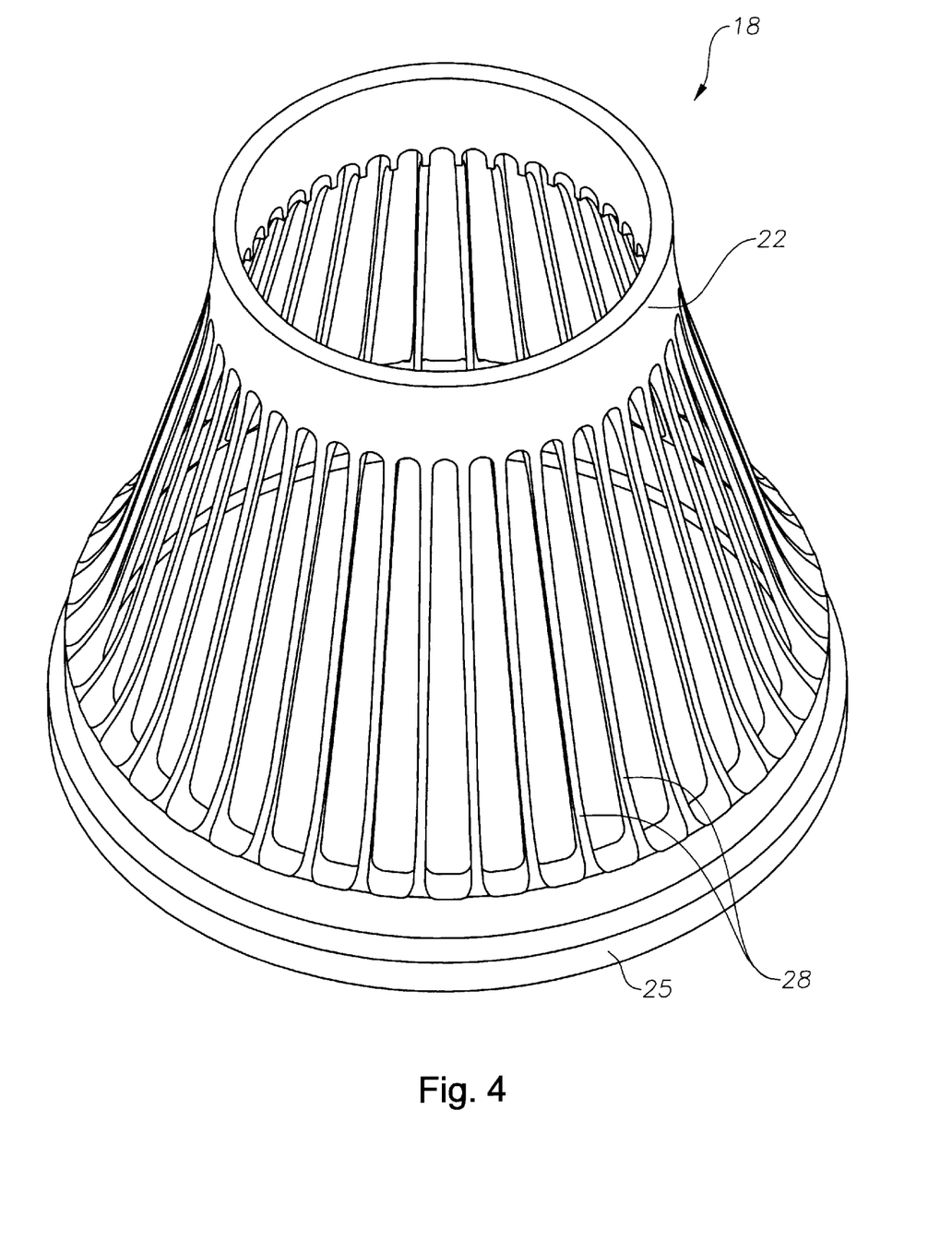
FIG. 4 is a perspective view of a conical spring-like member of the riser sleeve assembly of FIGS. 1(a)–3.
Figure 5:
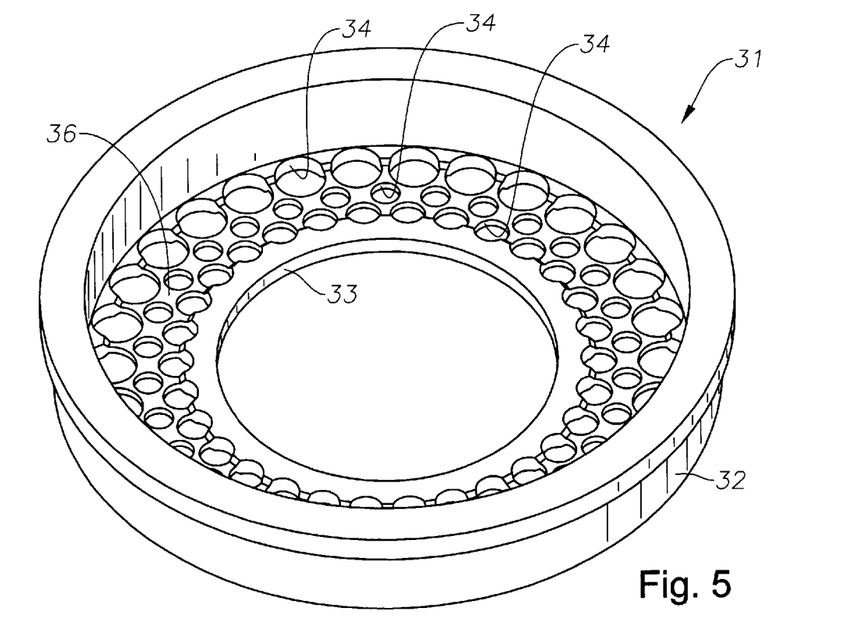
FIG. 5 is a perspective view of the alternate embodiment of the disk shown in FIG. 3, wherein the disk is perforated with holes.
Figure 6:
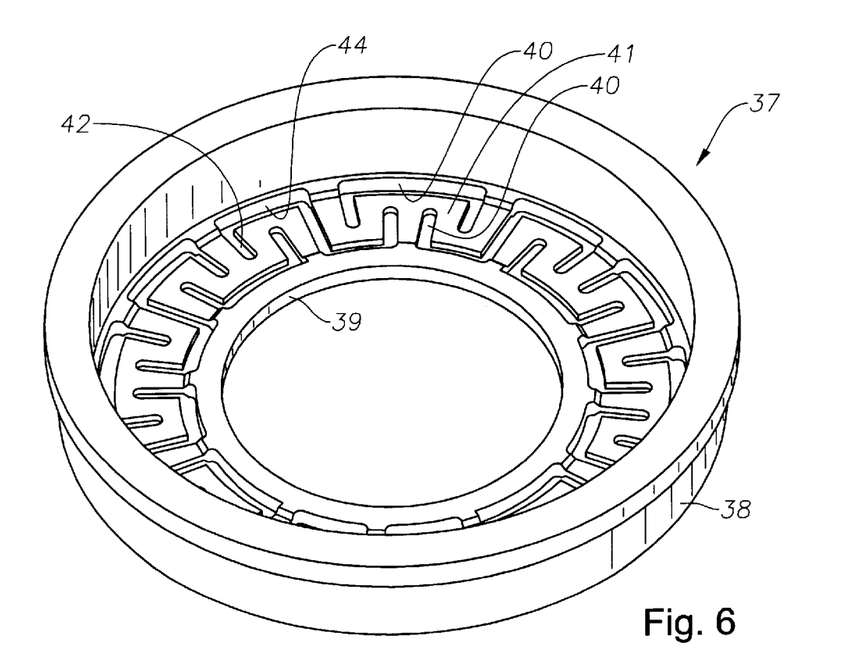
FIG. 6 is a perspective view of another embodiment of the disk shown in FIG. 1 (a), wherein the disk is perforated with slots.

Alternate embodiments for disks 20 are depicted in FIGS. 5 and 6 as disk 31 and disk 37, respectively. Unlike disks 20, disks 31, 37 allow some flexion from angular offset between riser pipe 14 and sleeve 12, but resist lateral loads. Flexion under angular offset may be accomplished by the perforated disk 31 of FIG. 5, which has a web 36 with holes or perforations 34. Perforated disk 31 has an outside surface 32 for engaging inner surface 13 of outer sleeve 12 and an inner surface 33 that is welded to the small diameter ring 22 (FIG. 3). The holes 34 in disk 31 define what may be considered multi-linked curved beams 36 within the disk body between holes 34. Perforated disk 31 allows angular movement of riser pipe 14 relative to sleeve 12 and is used in conjunction with spring-like member 18.

The slotted disk 37 of FIG. 6 also allows flexion in an angular direction. Slotted disk 37 has an outside surface 38 for engaging inner surface 13 of outer sleeve 12 and an inner surface 39 that is welded to the small diameter ring 22 (like FIG. 3). Slotted disk 37 allows flexion by the provision of a plurality of slots 40 within slotted disk 37. Beams 41 are formed between slots 40. In the embodiment shown in FIG. 6, slots 40 reverse on themselves. Slots 40 are comprised of radial slots 42 and circumferential slots 44, which join each other in serpentine fashion. Slotted disk 37 allows angular movement of riser pipe 14 relative to sleeve 12, but does provide stiff lateral resistance therebetween. To resist lateral and axial loads, conical spring-like member 18 and disks 20, 31 or 37 are used in combination as depicted in FIGS. 1(a)–3.

Referring now to FIGS. 7–9, an alternate embodiment of a riser sleeve assembly is designated generally 100 (FIGS. 8 and 9). An outer sleeve 112 is provided having an inner surface 113. Preferably, outer sleeve 112 engages a keel hole in a spar production platform, although outer sleeve 112 may be used to distribute a bending moment in other applications. Riser pipe 114 passes through outer sleeve 112. A solid, conical, outer guide member 115 spans between outer sleeve 112 and riser pipe 114 to engage riser pipe 114 via ring 116. A metal double conical spring-like member 117 (FIGS. 7–9) biases outer sleeve 112 away from riser pipe 114.

Double conical spring-like member 117 is made up of a central small diameter ring 118 that is supported between first beams 119 and second beams 120. Small diameter ring 118 is larger in inner diameter than the outer diameter of riser pipe 114. First beams 119 connect first outer ring 121 and central small diameter ring 118. Second beams 120 connect central small diameter ring 118 and second to outer ring 122. Second ring 122 is maintained away from riser pipe 114 by second guide member 123 (FIGS. 8 and 9). Second ring 122 has an inner diameter that is greater than the outer diameter of riser pipe 114. Second guide member 123 spans between second ring 122 and a support ring 124. Second guide member 123 transfers angular offset and axial load to second ring 122. Flexion between riser pipe 14 and outer sleeve 12 occurs at the center of ring 116. Outer guide members 115 and ring 116 transfer the lateral load from riser pipe 114 to outer sleeve 112. Support ring 124 is axially secured to riser pipe 114 by external attachment ring 125 and internal attachment ring 126. Attachment rings 125,126 allow support ring 124 slight axial lash.

First beams 119 and second beams 120 are designed to flex to allow an angular offset between riser pipe 114 and outer sleeve 112, but are designed to be relatively stiff and strong to withstand an axial load. As can be seen in FIGS. 8A and 8B, an upper double conical spring-like member 117 is typically used with a lower double conical spring-like member 117, but they are inverted relative to each other.

In practice, the riser sleeve assembly 100 may be used in any situation where axial and lateral load transfer exists between an outer sleeve 112 and a riser pipe 114. Such uses include situations wherein the outer sleeve 112 and riser pipe 114 pass through openings in the keel of a vessel, such as a spar platform (not shown). Additionally, the invention may be used in a tendon system and may be used for top and bottom flex joints in connection with a riser. When the riser pipe 114 and outer sleeve 112 move relative to one another, a moment in the riser 114 produces angular offset between riser pipe 114 and outer sleeve 112. Double conical spring-like members 117 transmit axial loading but allow flexion in an angular direction, as illustrated in FIG. 9.

The invention has numerous advantages for riser pipes that are subjected to lateral and axial loads. The new keel joint design of flexible steel cages and a wear sleeve decreases wear and joint weight. The keel joint acts as a "bumper"0 on the high pressure drilling riser for preventing damage to the riser. The flexible steel cages of the keel joint decouple axial and lateral loads to create less wear than ball joint designs. The angular and lateral flexibility of the invention is greater than solid designs, providing a greater reduction in bending moments and stress in the riser, and a consequent reduction in fatigue. The flexible cage is lighter that prior art designs, making it especially attractive for DDCVs (deep draft caisson vessels) and Spars.

While the invention has been shown in only one of its forms, it should be apparent to those skilled in the art that it is not so limited, but is susceptible to various changes without departing from the scope of the invention.

What is claimed is:

1. A riser joint for a riser extending between a floating vessel and a sea floor, the riser joint comprising:
    a tubular member having an axis;
    a sleeve surrounding a portion of the tubular member and having an upper end, a lower end, and a sleeve axis that substantially aligns with the axis of the tubular member;
    a metal upper element adjacent to the upper end of the sleeve, and having a first portion mounted to the sleeve, and a second portion mounted to the tubular member, wherein the first and second portions of the upper element are axially spaced apart;
    a metal lower element adjacent to the lower end of the sleeve, and having a first portion mounted to the sleeve, and a second portion mounted to the tubular member, wherein the first and second portions of the lower element are axially spaced apart; and wherein
    the upper and lower elements have apertures therein between the first and second portions to allow angular and radial flexibility of the tubular member relative to the sleeve and resist axial motion of the tubular member relative to the sleeve.

2. The riser joint of claim 1 wherein each of the upper and lower elements are generally frustoconical in shape.

3. The riser joint of claim 1 wherein the first portion of each of the upper and lower elements comprises a larger diameter ring, and the second portion of each of the upper and lower elements comprises a smaller diameter ring, the rings of each of the elements being interconnected by a plurality of beams defined by the apertures.

4. The riser joint of claim 1 wherein the upper element has the same configuration as the lower element but is inverted relative to the lower element.

5. The riser joint of claim 1 wherein the first portion of the upper element is to located axially below the second portion of the upper element, and the first portion of the lower element is located axially above the second portion of the upper element.

6. The riser joint of claim 1, farther comprising a pair of axially spaced-apart attachment rings associated with each of the upper and lower elements for securing respective ones of the second portions of the upper and lower elements to the tubular member.

7. The riser joint of claim 1, further comprising:
    a metal upper support member having an outer diameter and mounted adjacent to the upper end of the sleeve and extending radially toward the tubular member;
    a metal lower support member having an outer diameter and mounted adjacent to the lower end of the sleeve and extending radially toward the tubular member, wherein the upper and lower support members resist radial motion of the tubular member relative to the sleeve.

8. The riser joint of claim 7, further comprising a support member sleeve associated with each of the upper and lower elements, wherein one of the support member sleeves extends between each of the support members and the first portion of a respective one the upper and lower elements, and wherein each of the support member sleeves has an axial dimension that is approximately equal to an axial dimension of a respective one of the upper and lower elements.

9. The riser joint of claim 7 wherein each of the support members comprises a solid disk.

10. The riser joint of claim 7 wherein each of the support members comprises a perforated disk with a plurality of holes to allow angular flexure between the sleeve and the tubular member.

11. The riser joint of claim 7 wherein each of the support members comprises a slotted disk having slots formed in a serpentine pattern to allow angular flexure between the sleeve and the tubular member.

12. The riser joint of claim 7 wherein each of the support members are substantially axially aligned with a respective one of the second portions of the upper and lower elements.

13. The riser joint of claim 1 wherein each of the upper and lower elements comprises a pair of inverted, frustoconical portions having smaller diameter ends that are joined to each other to define a central ring, and wherein the first and second portions of each of the upper and lower elements are interconnected by a plurality of beams with respective ones of the central rings.

14. The riser joint of claim 1 wherein the first portion of the upper element is located axially above the second portion of the upper element, and the first portion of the lower element is located axially below the second portion of the upper element.

15. The riser joint of claim 1 wherein each of the upper and lower elements comprises a pair of inverted, frustoconical portions having smaller diameter ends that are joined to each other to define a central ring with an inner diameter that is greater than a diameter of the tubular member, wherein the second portion of each of the upper and lower elements comprises a ring having a diameter that is greater than the diameter of the tubular member and smaller than an inner diameter of the sleeve; and further comprising:
    a conical guide member for each of the upper and lower elements that connects the respective second portions to the tubular member.

16. A riser joint for a riser extending between a floating vessel and a sea floor, the riser joint comprising:
   a tubular member having an axis;
   a cylindrical sleeve surrounding a portion of the tubular member and having an upper end, a lower end, and a sleeve axis that is substantially concentric with the tubular member axis;
   a resilient upper element located adjacent to the upper end of the sleeve, the upper element having a first portion mounted to the sleeve, and a second portion smaller in diameter than the upper end and mounted to the tubular member, wherein the first and second portions of the upper element are axially spaced apart;
   a resilient lower element located adjacent to the lower end of the sleeve, the lower element having a first portion mounted to the sleeve, and a second portion smaller in diameter than the lower end and mounted to the tubular member, wherein the first and second portions of the lower element are axially spaced apart; and wherein
   the upper and lower elements have frustoconical configurations with sloping sidewalls, the sidewalls having elongated slots, defining beams to allow angular and radial flexibility of the tubular member relative to the sleeve and resist axial motion of the tubular member relative to the sleeve.

17. The riser joint of claim 16, further comprising:
   an upper disk mounted adjacent to the upper end of the sleeve and substantially axially aligned with the second portion of the upper element; and
   a lower disk mounted adjacent to the lower end of the sleeve and substantially axially aligned with the second portion of the lower element, wherein the upper and lower disks resist radial motion of the tubular member relative to the sleeve.

18. The riser joint of claim 17 wherein each of the disks is perforated with a plurality of holes to allow angular flexure between the sleeve and the tubular member.

19. The riser joint of claim 17 wherein each of the disks is slotted in a serpentine fashion to allow angular flexure between the sleeve and the tubular member.

20. The riser joint of claim 16 wherein the upper element has the same configuration as the lower element but is inverted relative to the lower element.

21. The riser joint of claim 16 wherein each of the upper and lower elements comprises a pair of inverted, frustoconical portions having smaller diameter ends that are joined to each other to define a central ring, and wherein the first and second portions of each of the upper and lower elements are interconnected by a plurality of beams with respective ones of the central rings.

22. The riser joint of claim 21 wherein each of the central rings has an inner diameter that is greater than a diameter of the tubular member, and the second portion of each of the upper and lower elements comprises a ring having a diameter that is greater than the diameter of the tubular member and smaller than an inner diameter of the sleeve; and further comprising:
   a conical guide member for each of the upper and lower elements that connects the respective second portions to the tubular member.

23. A riser joint for a riser extending between a floating vessel and a sea floor, the riser joint comprising:
   a tubular member having an axis;
   a sleeve surrounding a portion of the tubular member and having an upper end, a lower end, and a sleeve axis that substantially aligns with the axis of the tubular member;
   a metal upper element adjacent to the upper end of the sleeve, and having a first portion mounted to the sleeve, and a second portion mounted to the tubular member, wherein the first and second portions of the upper element are axially spaced apart;
   an upper disk mounted adjacent to the upper end of the sleeve and substantially axially aligned with the second portion of the upper element;
   a metal lower element adjacent to the lower end of the sleeve, and having a first portion mounted to the sleeve, and a second portion mounted to the tubular member, wherein the first and second portions of the lower element are axially spaced apart, and wherein the lower element has the same configuration as the upper element but is inverted relative to the upper element;
   a lower disk mounted adjacent to the lower end of the sleeve and substantially axially aligned with the second portion of the lower element, wherein the upper and lower disks resist radial motion of the tubular member relative to the sleeve; wherein
   the upper and lower elements have apertures therein between the first and second portions to allow angular and radial flexibility of the tubular member relative to the sleeve and resist axial motion of the tubular member relative to the sleeve; and wherein
   each of the upper and lower elements comprises a pair of inverted, frustoconical portions having smaller diameter ends that are joined to each other to define a central ring with an inner diameter that is greater than a diameter of the tubular member, wherein the second portion of each of the upper and lower elements comprises a ring having a diameter that is greater than the diameter of the tubular member and smaller than an inner diameter of the sleeve; and
   a conical guide member for each of the upper and lower elements that connects the respective second portions to the tubular member.

24. A riser joint comprising:
   a tubular member having an axis;
   a sleeve surrounding a portion of the tubular member and having an upper end, a lower end, and a sleeve axis that substantially aligns with the axis of the tubular member;
   a metal resilient element adjacent to one end of the sleeve, and having a first portion mounted to the sleeve, and a second portion mounted to the tubular member, wherein the first and second portions of the resilient element are axially spaced apart; and wherein
   the resilient element has apertures therein between the first and second portions to allow angular and radial flexibility of the tubular member relative to the sleeve and resist axial motion of the tubular member relative to the sleeve.

25. The riser joint of claim 24 wherein the resilient element is generally frustoconical in shape.

26. The riser joint of claim 24 wherein the first portion of the resilient element comprises a larger diameter ring, and the second portion of the resilient element comprises a smaller diameter ring, the rings of the resilient element being interconnected by a plurality of beams defined by the apertures.

27. The riser joint of claim 24, further comprising:
   a metal support member having an outer diameter and mounted adjacent to the said one end of the sleeve and extending radially toward the tubular member, to resist radial motion of the tubular member relative to the sleeve.

28. The riser joint of claim 24 wherein the resilient element comprises a pair of inverted, frustoconical portions having smaller diameter ends that are joined to each other to define a central ring, and wherein the apertures in the resilient element comprise elongated slots within the frustoconical portions, defining a plurality of beams.

29. The riser joint of claim 24 wherein the resilient element comprises a pair of inverted, frustoconical portions having smaller diameter ends that are joined to each other to define a central ring with an inner diameter that is greater than a diameter of the tubular member, and wherein the apertures of the resilient element comprise elongated slots, defining a plurality of beams; and further comprising:

a conical guide member located within one of the frustoconical portions and connected to the tubular member.

30. A riser joint comprising:

a tubular member having an axis;

a cylindrical sleeve surrounding a portion of the tubular member and having an upper end, a lower end, and a sleeve axis that is substantially concentric with the tubular member axis;

a resilient element located adjacent to one of the ends of the sleeve, the resilient element having a first portion mounted to the sleeve, and a second portion smaller in diameter than said one end of the sleeve and mounted to the tubular member, wherein the first and second portions of the resilient element are axially spaced apart; and wherein the resilient element has a frustoconical configuration with a sidewall having elongated slots, defining beams to allow angular and radial flexibility of the tubular member relative to the sleeve and resist axial motion of the tubular member relative to the sleeve.

31. The riser joint of claim 30 wherein the resilient element comprises a pair of inverted, frustoconical portions having smaller diameter ends that are joined to each other to define a central ring with an inner diameter larger than the tubular member.

32. The riser joint of claim 31, further comprising:

a conical guide member located within one of the frustoconical portions and connected to the the tubular member.

33. A riser joint comprising:

a tubular member having an axis;

a sleeve surrounding a portion of the tubular member and having an upper end, a lower end, and a sleeve axis that substantially aligns with the axis of the tubular member;

a metal resilient element adjacent to the one of the ends of the sleeve, having a first portion mounted to the sleeve and a second portion mounted to the tubular member, and wherein the first and second portions of the resilient element are axially spaced apart;

the resilient element has apertures therein between the first and second portions to allow angular and radial flexibility of the tubular member relative to the sleeve and resist axial motion of the tubular member relative to the sleeve; and wherein the resilient element comprises a pair of inverted, frustoconical portions having smaller diameter ends that are joined to each other to define a central ring with an inner diameter that is greater than an outer diameter of the tubular member.

34. The riser according to claim 33, further comprising:

a first conical guide member located within one of the frustoconical portions and connected to the tubular member.

35. The riser according to claim 34, further comprising:

a second conical guide member located within the other of the frusto-conical portions and connected to the tubular member.

* * * * *

UNITED STATES PATENT AND TRADEMARK OFFICE
CERTIFICATE OF CORRECTION

PATENT NO.    : 6,422,791 B1                                          Page 1 of 1
DATED         : July 23, 2002
INVENTOR(S)   : Joseph William Pallini, Jr. et al.

It is certified that error appears in the above-identified patent and that said Letters Patent is hereby corrected as shown below:

Column 5,
Line 23, after "bumper" delete "0".

Signed and Sealed this

Fourth Day of February, 2003

JAMES E. ROGAN
*Director of the United States Patent and Trademark Office*